(12) United States Patent
Herreria et al.

(10) Patent No.: US 10,769,355 B2
(45) Date of Patent: Sep. 8, 2020

(54) MANAGING EXTENDED SCHEMAS

(71) Applicant: Oracle International Corporation, Redwood Shores, CA (US)

(72) Inventors: Jorge Herreria, Littleton, CO (US); Thomas Hora, Parker, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/145,042

(22) Filed: Sep. 27, 2018

(65) Prior Publication Data

US 2019/0095404 A1   Mar. 28, 2019

Related U.S. Application Data

(60) Provisional application No. 62/564,942, filed on Sep. 28, 2017.

(51) Int. Cl.
| | |
|---|---|
| *G06F 40/154* | (2020.01) |
| *G06F 3/0482* | (2013.01) |
| *G06F 16/901* | (2019.01) |
| *G06F 40/106* | (2020.01) |
| *H04L 29/08* | (2006.01) |
| *G06F 8/20* | (2018.01) |
| *G06F 16/84* | (2019.01) |
| *G06F 16/10* | (2019.01) |
| *G06Q 10/10* | (2012.01) |
| *G06F 8/10* | (2018.01) |
| *G06F 17/00* | (2019.01) |

(52) U.S. Cl.
CPC .......... *G06F 40/154* (2020.01); *G06F 3/0482* (2013.01); *G06F 16/9027* (2019.01); *G06F 40/106* (2020.01); *G06F 8/10* (2013.01); *G06F 8/20* (2013.01); *G06F 16/10* (2019.01); *G06F 16/84* (2019.01); *G06F 16/86* (2019.01); *G06Q 10/10* (2013.01); *H04L 67/1095* (2013.01)

(58) Field of Classification Search
CPC .. G06F 17/2288; G06F 17/2247; G06F 16/10; G06F 16/84; G06F 16/86; G06F 8/20; G06F 40/154; G06F 40/106; G06F 16/9027; G06F 3/0482; H04L 67/1095; G06Q 10/10

See application file for complete search history.

(56) References Cited

U.S. PATENT DOCUMENTS

| | | | | |
|---|---|---|---|---|
| 2009/0300656 | A1* | 12/2009 | Bosworth | ........... G06F 12/0875 |
| | | | | 719/320 |
| 2010/0235725 | A1* | 9/2010 | Drayton | .............. G06F 17/2241 |
| | | | | 715/234 |

* cited by examiner

*Primary Examiner* — Quoc A Tran
(74) *Attorney, Agent, or Firm* — Trellis IP Law Group, PC

(57) ABSTRACT

Implementations generally relate to extended schemas. In some implementations, a method includes displaying a first extensible markup language schema definition (XSD) schema, where the first XSD schema includes a plurality of XSD elements arranged in a tree structure. The method further includes receiving a selection of at least one XSD element of the plurality of XSD elements. The method further includes displaying one or more XSD extension selections associated with the at least one XSD element. The method further includes receiving at least one XSD extension selection of the one or more XSD extension selections. The method further includes appending in the tree structure at least one XSD extension element based on the at least one XSD extension selection.

20 Claims, 12 Drawing Sheets

MANAGING EXTENDED SCHEMAS

CROSS REFERENCES TO RELATED APPLICATIONS

This application claims priority from U.S. Provisional Patent Application No. 62/564,942, entitled MANAGING EXTENDED SCHEMAS, filed on Sep. 28, 2017 (ORACP0206P/ORA180276-US-PSP), which is hereby incorporated by reference as if set forth in full in this application for all purposes.

BACKGROUND

An extensible markup language (XML) document based on a schema of elements defined by data types may have element instances with different structures. This may be due to differences among the data types extending from base data types. XML schema definition (XSD) schemas are sometimes graphically represented on tree structures. One problem involves graphically representing extended data types. To accurately create an extensible stylesheet language transformations (XSLT) map for an element, a user needs to know if data elements are extendable, the data type names and namespaces, and child elements or attributes that are valid under each specific extending data type. Another problem is the management of extending data types. Some XSD schemas define many extending data types for the same base data type, which can be cumbersome for a developer.

SUMMARY

Implementations generally relate to extended schemas. In some implementations, a method includes displaying a first extensible markup language schema definition (XSD) schema, where the first XSD schema includes a plurality of XSD elements arranged in a tree structure. The method further includes receiving a selection of at least one XSD element of the plurality of XSD elements. The method further includes displaying one or more XSD extension selections associated with the at least one XSD element. The method further includes receiving at least one XSD extension selection of the one or more XSD extension selections. The method further includes appending in the tree structure at least one XSD extension element based on the at least one XSD extension selection.

A further understanding of the nature and the advantages of particular embodiments disclosed herein may be realized by reference of the remaining portions of the specification and the attached drawings.

DETAILED DESCRIPTION OF EMBODIMENTS

Figure 1:
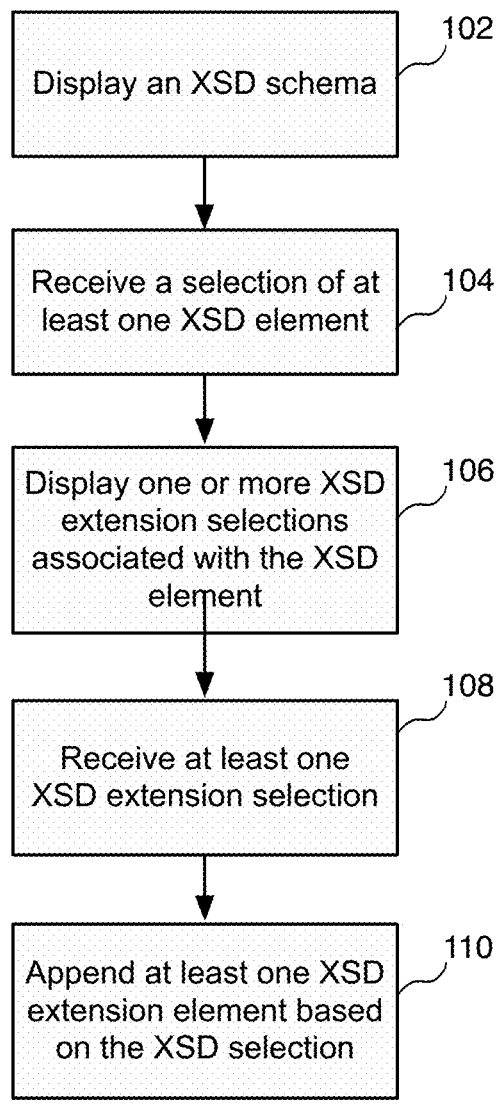
FIG. 1 illustrates an example flow diagram for managing extended schemas, according to some implementations.

Implementations described herein provide extended schemas. As described in more detail herein, implementations enable a user to easily locate, manage, and map elements with data types, in particular, elements with polymorphic data type (has extending data types). Implementations identify (e.g., flag) elements with a distinctive icon in the user interface tree. This enables a user/developer to easily identify the elements. Implementations also enable a user to quickly map XSD elements of a source XSD schema with corresponding elements of a target XSD schema, in part by conveniently displaying XSD extension elements as needed.

As described in more detail herein, in various implementations, a system displays a source extensible markup language schema definition (XSD) schema and a target XSD schema, where the source and target XSD schemas include XSD elements arranged in tree structures. The system receives a selection of at least one of the XSD elements, and in response displays one or more XSD extension selections associated with the selected XSD element. The system receives an XSD extension selection, and the system appends in the tree structure one or more XSD extension elements based on the XSD selection. In some implementations, when a user enters a mapper UI, the existing map already contains maps for XSD elements, and these XSD elements correspond to an XSD extension. The system will detect them and automatically loads the XSD extension elements into the corresponding tree (source and/or target trees).

The following are definitions to provide further context and applications of implementations described herein. In various implementations, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature, e.g., stored or arranged data, that is provided via computer code, e.g., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

In various implementations, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

An enterprise computing environment may be any collection of computing resources of an organization used to perform one or more tasks involving computer processing. An example enterprise computing environment includes various computing resources distributed across a network, and may further include private and shared content on intranet web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include human resources (HR) (e.g., enterprise personnel), financial resources, assets, employees, business contacts, sales data, and so on, of an enterprise. Examples of enterprise software include enterprise resource planning (ERP) software for facilitating managing enterprise activities (e.g., product planning, inventory management, marketing, sales, and so on). Example ERP applications include customer relationship management (CRM), human capital management (HCM), business intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as UI software modules or components.

Note that conventionally, while certain financial tools, tables, and so on (e.g., balance sheets, cash flow statements, etc.), are standardized, different companies may prefer to maintain and view operational and financial planning data and tasks differently, e.g., in accordance with different business and computing environment requirements. This can be particularly true at granular levels, i.e., where detailed enterprise data must be observed and analyzed in accordance with business planning objectives.

For example, a particular service company may experience substantial compensation expenses (e.g., payments to employees, contractors, etc.), which may represent the primary driver for expense planning. Similarly, a small consulting company may experience substantial travel expenses, which may represent a primary driver for expense planning. Accordingly, two different service companies may base their expense planning on substantially different drivers.

Similarly, different companies may employ different methods of accounting, e.g., a direct method or indirect method of accounting. Accordingly, different companies may rely upon different drivers for handling accounting details.

Furthermore, the granularity of planning (i.e., the level of detail demanded or required) may vary across different companies and/or business types, segments, or other domains. For example, a fast moving consumer goods company may plan revenue by product, market, channel, and segment, whereas an information technology (IT) company may plan revenue by service, market, and customers. Accordingly, different companies may rely upon different drivers for various types of planning.

In addition, while certain companies may prefer to perform business planning using a collection of standard or common drivers and associated software modules and functionality (e.g., standard labor, material, etc.), other companies may prefer to perform direct entry for project expenses, revenue, etc.

Accordingly, different businesses may have different planning requirements or needs, which can be difficult to meet using conventional static business planning modules and associated software applications. Certain implementations discussed more fully below provide systems and accompanying mechanisms and methods for enabling dynamic adaptation of an existing initial business planning model (which may be called a seed model herein), thereby enabling the initial seed planning model to uniquely grow to meet individual or specific needs of a given business or organization.

For clarity, certain well-known components, such as hard drives, processors, operating systems, power supplies, routers, Internet service providers (ISPs), identity management systems, workflow orchestrators, process schedulers, integration brokers, tenant automation systems (TASs), online analytical processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 illustrates an example flow diagram for managing extended schemas, according to some implementations. As described in more detail herein, a system enables a user to easily map elements of a source XSD schema with corresponding elements of a target XSD schema, in part by conveniently displaying XSD extension elements as needed.

As described in more detail herein, various implementations manage extensible markup language schema definitions, also referred to as XML schemas or XSD schemas. In various implementations, XSD Schemas have extended data types (polymorphic elements) in an integrated cloud service (ICS) JETMapper (XSL Mapping UI Tool). In some implementations, such extended data types may be identified and managed to create XSL maps or XPath Expressions. XSD Schemas can have data types that extend complex data types. This extension creates polymorphic elements in the XML documents.

In various implementations, a method is initiated at block 102, the system such as a client device displays a first extensible markup language schema definition (XSD schema), where the first XSD schema includes XSD elements. In some implementations, the system arranges the XSD elements in a tree structure, which is described in more detail herein. In various implementations, some XSD elements have extended data types, also referred to as polymorphic elements.

In various implementations, an XML document may be based on a schema that has elements defined by a data type that is an extended type. Such an XML document may have element instances with different structures due to the differences among the data types extending the base data type. Such an XSD element is polymorphic in that it has associated XSD extension elements.

In various implementations, on extensible stylesheet language transformations (XSLT) user interface (UI) editors (Mapping tools), XSD Schemas are graphically represented on tree structures, where each node represents an element or an attribute of the schema. For an XSD element based on a complex data type, the child elements defined in the complex data type are represented as children nodes of the element based on the complex data type.

Figure 2:
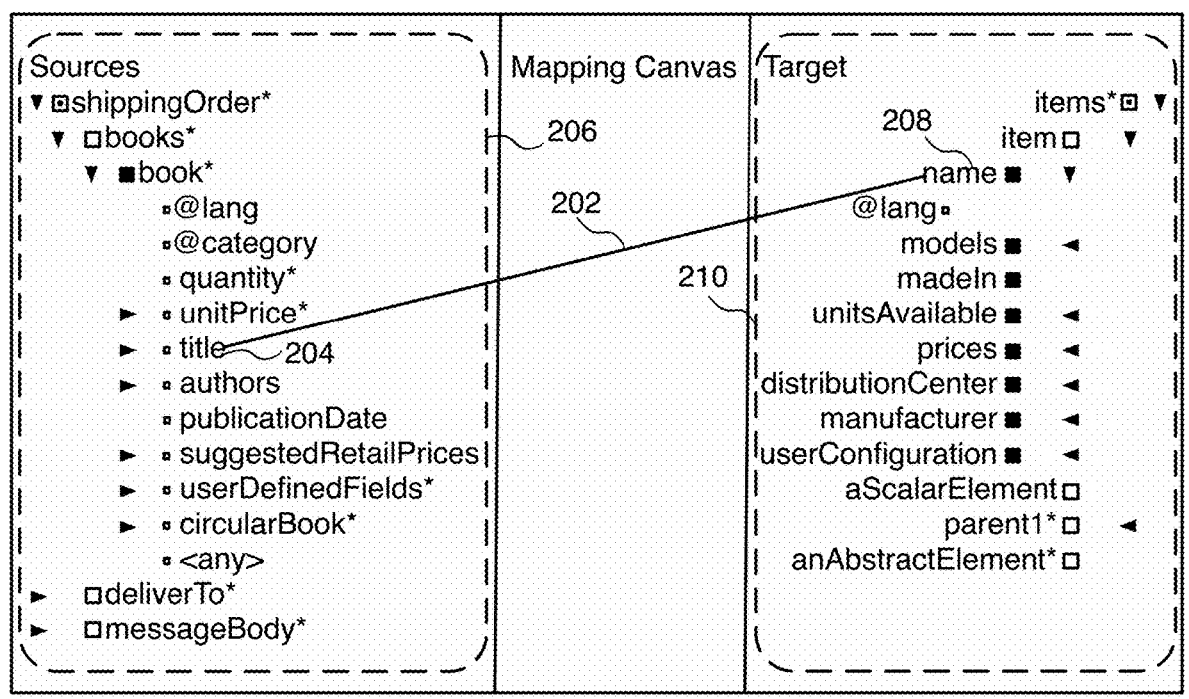
FIG. 2 illustrates an example user interface (UI) showing an example mapping between an element of a source XSD schema and a corresponding XSD element of a target XSD schema, according to some implementations.

FIG. 2 illustrates an example UI 200 showing an example mapping 202 between an element 204 (labeled "title") of a source XSD schema 206 and a corresponding XSD element 208 (labeled "name") of the target XSD schema 210, according to some implementations.

Figure 3:
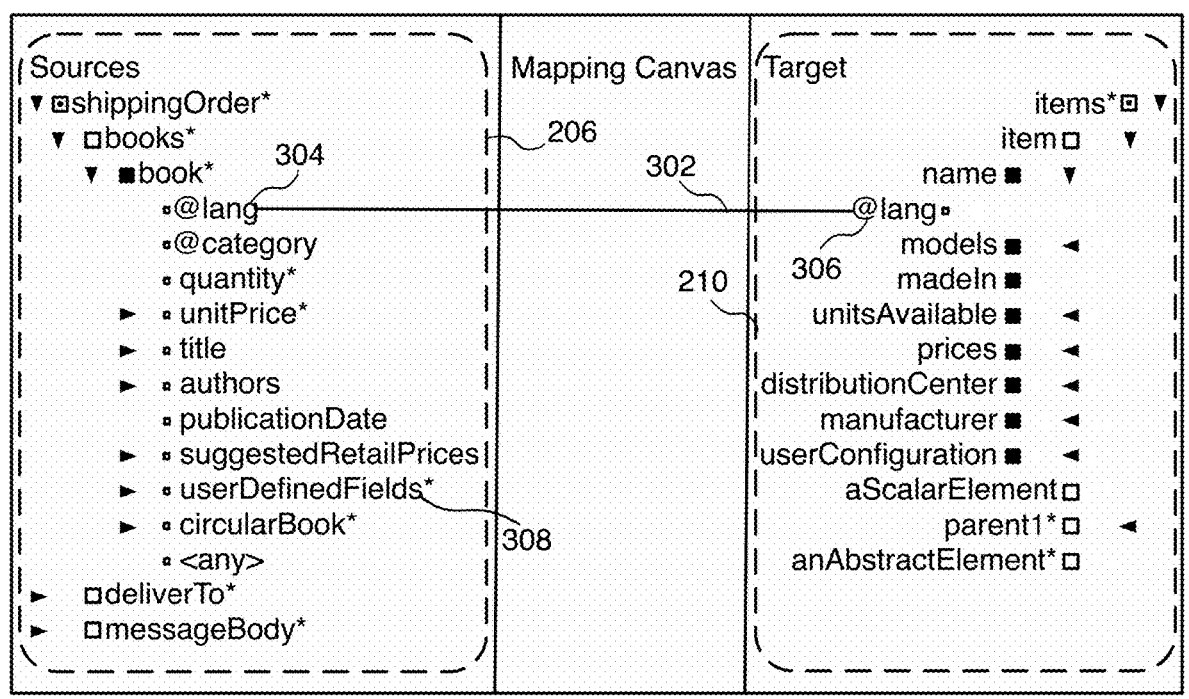
FIG. 3 illustrates an example UI showing another example mapping between an element of a source XSD schema and a corresponding XSD element of a target XSD schema, according to some implementations.

FIG. 3 illustrates example UI 200 showing another example mapping 302 between an element 304 (labeled "@lang") of source XSD schema 206 and a corresponding XSD element 306 (labeled "@lang") of target XSD schema 210, according to some implementations.

Referring still to FIG. 1, at block 104, the system receives a selection of at least one XSD element. In various implementations, the system enables the user to select via a context menu which extending data types they want to load in the schema tree. For example, a user may have selected XSD element 308 (labeled "userDefinedFields").

For each extending data type selected and loaded, a new node element is rendered in the schema tree. Each polymorphic element loaded in the tree discloses its extending the data type, and also renders all the elements available under its data type as child elements/attributes. This is how the complete structure of the extending data type is represented.

At block 106, the system displays one or more XSD extension selections associated with the at least one XSD element. Once the extending data type is loaded the user has the information handy for creating XSLT mappings or XPath expression for those elements. In various implementations, some data types may be extended, where an extending data type, also referred to as derived data type, may define additional child elements or attributes for the data type. By extending data types, the element based on that data type becomes polymorphic.

The nodes representing the polymorphic element type are rendered as siblings of the node representing the element with the data type without extension. Therefore, multiple representations of the same element are visually displayed in the schema tree. As a result, a user can easily view XSD extension elements in a user interface, as well as map XSD elements between a source XSD schema and a target XSD schema.

Implementations described herein graphically represent these polymorphic elements in such a way that the user can discover and distinguish the polymorphic elements. It is helpful for the user to know that the element is polymorphic, as well as the extending data type name and namespace, and the child elements or attributes that are valid under each specific extending data type. This information aids the user in accurately creating an XSLT map for elements, or in creating an XPath expression referencing that element.

Implementations also manage polymorphic elements. Some XSD schemas define many extended data types for the same base data type (many polymorphic elements). A developer may not need all of the extended data types rendered in the UI tree. The developer may merely need a subset of the extended data types for doing mappings or XPath expressions. Implementations enable the developer to select what extended data types are to be rendered in the schema tree.

Figure 4:
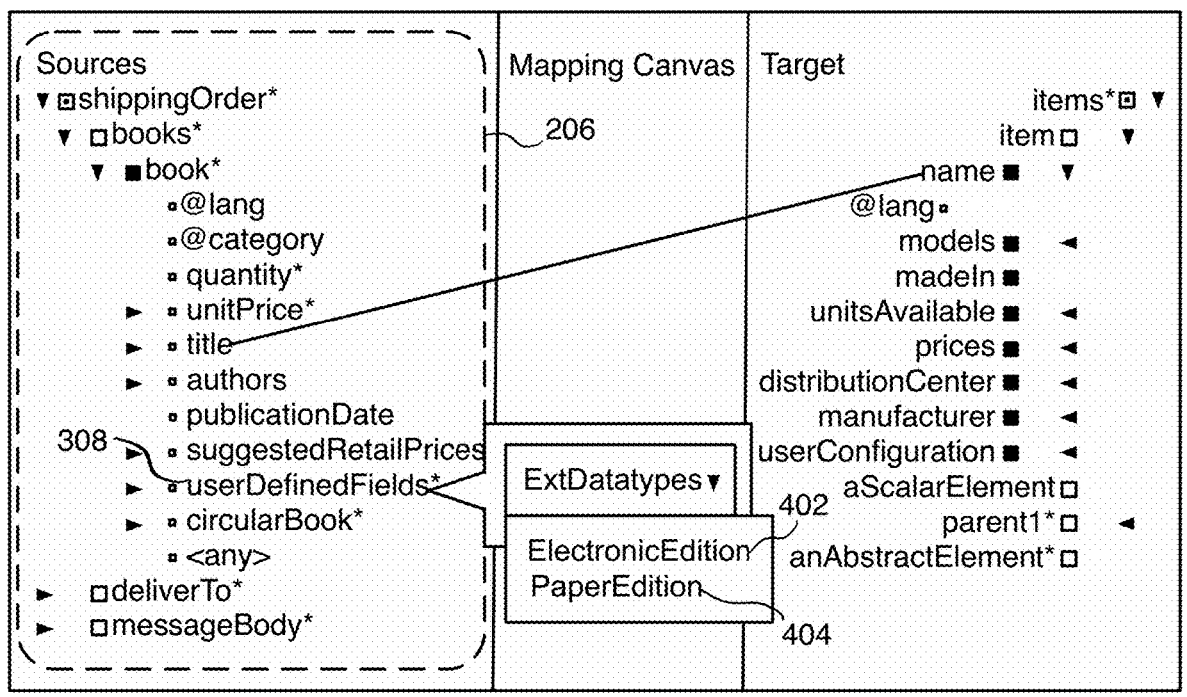
FIG. 4 illustrates an example UI showing example XSD extension selections, according to some implementations.

FIG. 4 illustrates an example UI showing example XSD extension selections 402 and 404 (labeled "ElectronicEdition" and "PaperEdition," respectively), according to some implementations. Also shown is XSD element 308 to which XSD extension selections 402 and 404 are associated.

As described herein, for XSD elements having data types that are polymorphic (e.g., having extending data types), an XSD element is identified (flagged) with a distinctive icon in the UI tree. This enables a user/developer to identify them easily. In some implementations, the system displays one or more extendable indications in UI 200, where each extendable indication indicates that a corresponding XSD element is extendable. For example, such an extendable indication may be a predetermined symbol such as an asterisk (e.g., "*"), where the predetermined symbol indicates that a corresponding XSD element is extendable. As shown, XSD element 308 has an asterisk symbol ("*") next to "userDefinedFields," which indicates that XSD element 308 is extendable.

At block 108, the system receives at least one XSD extension selection. For example, XSD extension selection 402 ("ElectronicEdition") may be selected. In various implementations, the system may display a context menu, where the context menu enables a user to select one or more extending data types to load in the tree structure. For example, the system may enable a user to right click to have the system show the context menu. For each extending data type selected/loaded a new node element is rendered in the schema tree.

Each polymorphic element loaded in the tree discloses its extending data type; and also renders all the elements available under its data type as child elements/attributes. This is how the complete structure of the extended data type is represented.

At block 110, the system appends in the tree structure at least one XSD extension element based on the at least one XSD extension selection. As a result, any appended XSD extension element is displayed in the tree structure. In various implementations, once the extended data type is loaded, the user has the information handy for creating XSLT mappings or XPath expression for those elements.

In some implementations, the XSD elements representing the polymorphic element type are rendered as siblings of the node representing the element with the data type without an extension. As such, multiple representations of the same element are visually displayed in the schema tree.

Figure 5:
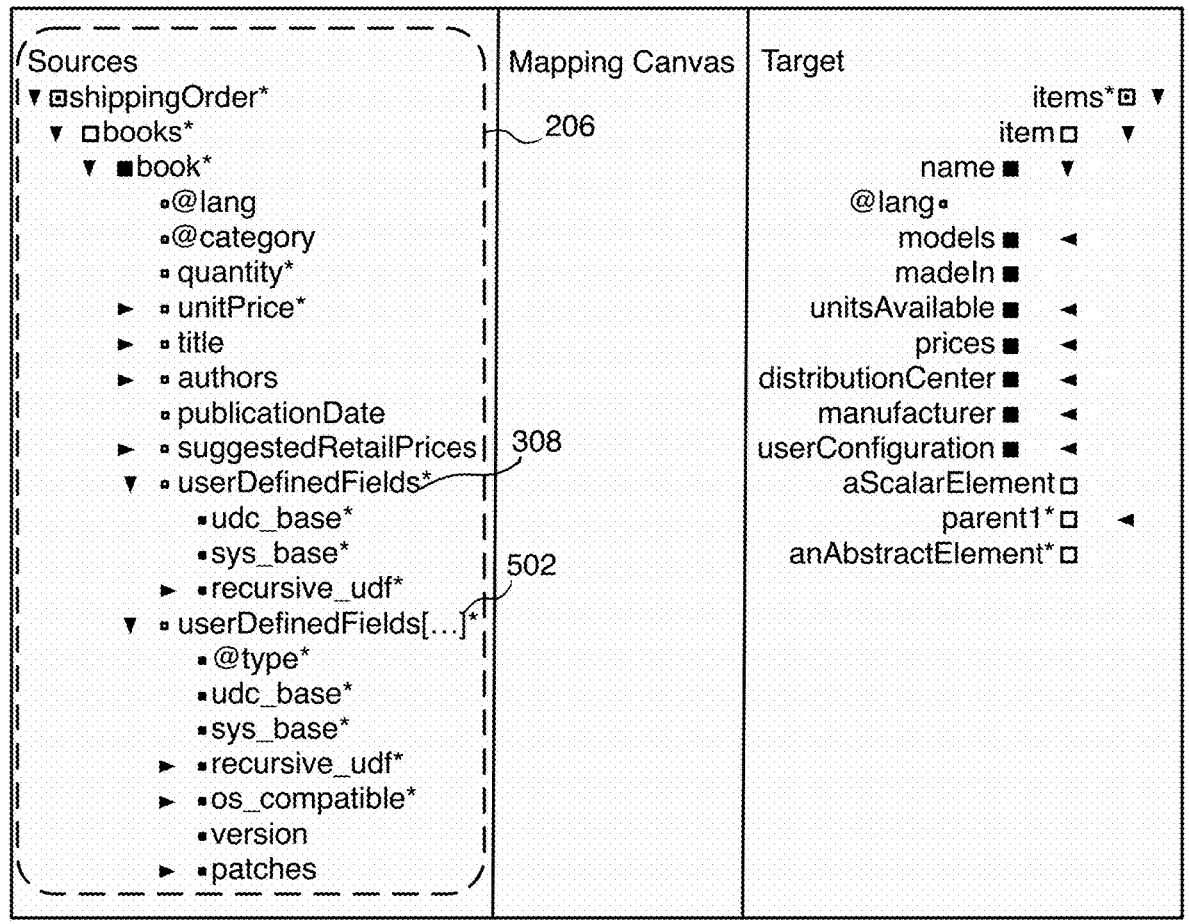
FIG. 5 illustrates an example UI showing an example XSD extension element, according to some implementations.

FIG. 5 illustrates an example UI showing an example XSD extension element 502 (labeled in part "userDefinedFields . . . ElectronicEdition"), according to some implementations. In some implementations, the label portion "userDefinedFields" indicates an association with the base XSD element 308 ("userDefinedFields") and the label portion "ElectronicEdition" indicates that XSD extension element 502 is an electronic edition XSD extension element.

Figure 6:
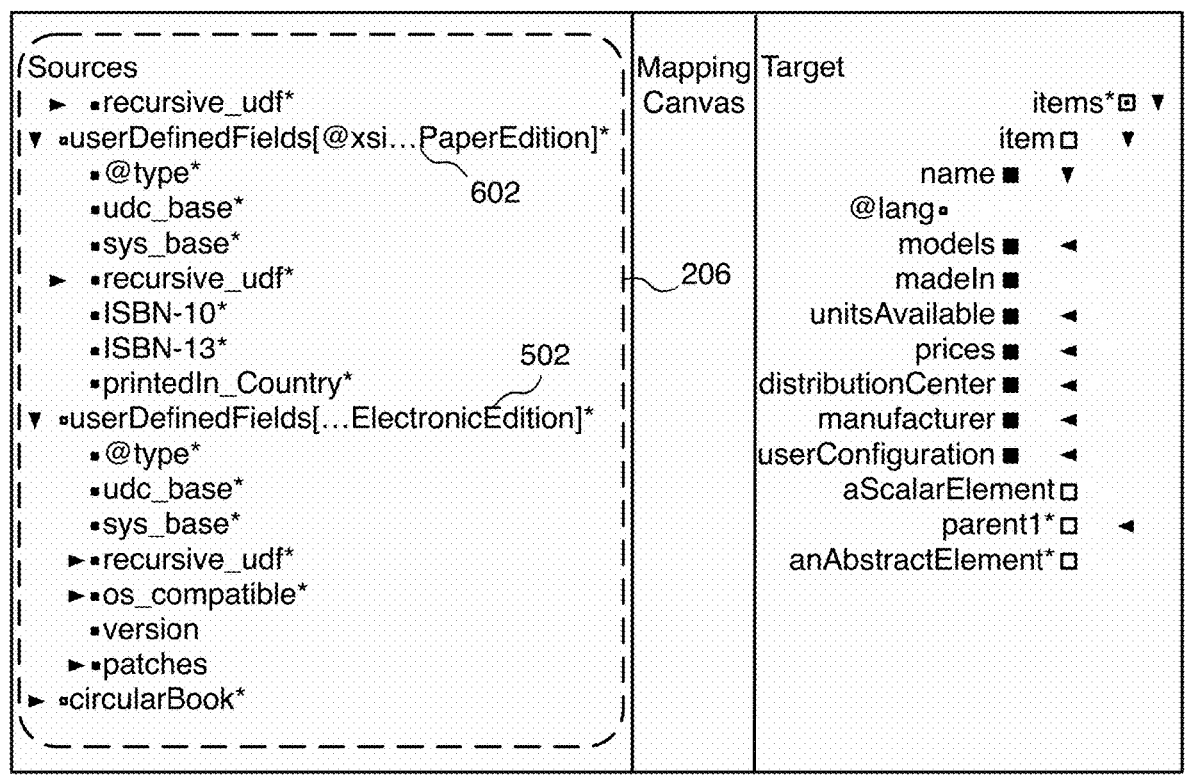
FIG. 6 illustrates an example UI showing another example XSD extension element, according to some implementations.

FIG. 6 illustrates an example UI showing another example XSD extension element 602 (labeled in part "userDefinedFields . . . PaperEdition"), according to some implementations. In some implementations, the label portion "userDefinedFields" indicates an association with the base XSD element 308 (not shown) and the label portion "PaperEdition" indicates that XSD extension element 602 is a paper edition XSD extension element. Also shown is XSD extension element 502.

Figure 7:
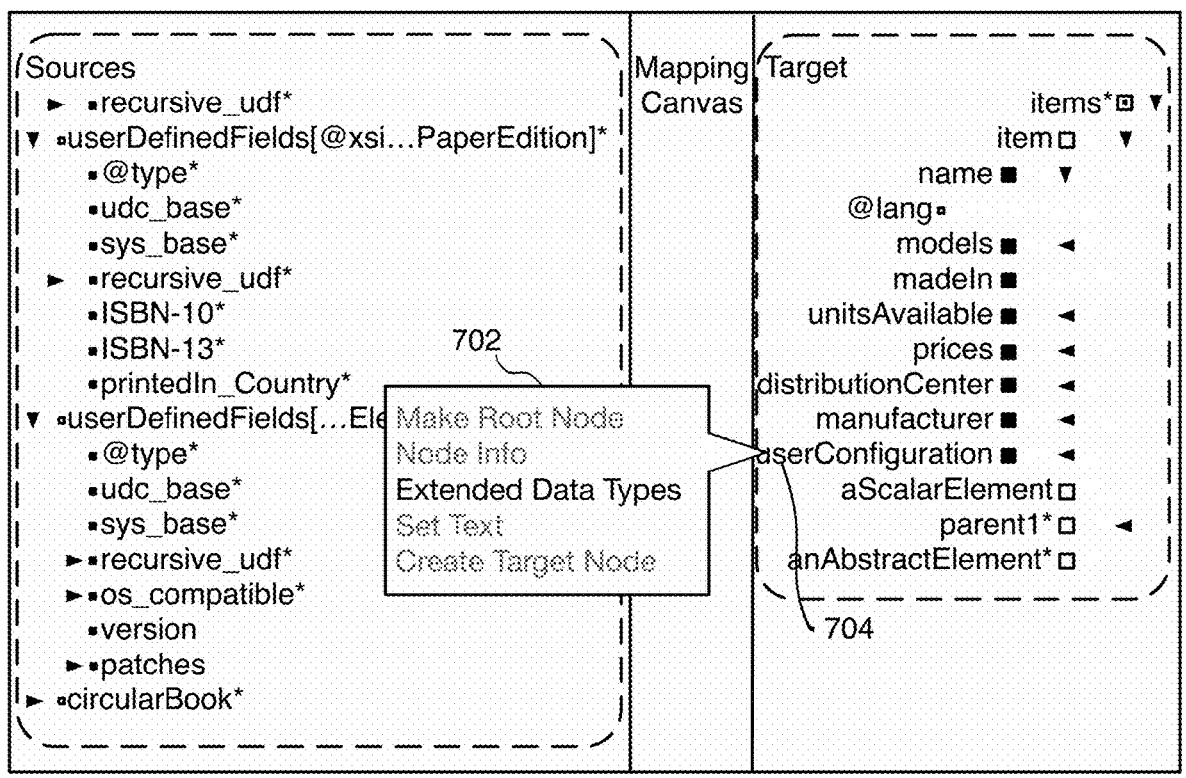
FIG. 7 illustrates an example UI showing an example menu associated with an XSD extension element, according to some implementations.

FIG. 7 illustrates an example UI showing an example menu 702 associated with an XSD extension element 704, according to some implementations. As shown, menu 702 is associated with XSD extension element 704 (partially shown) of target XSD schema 210.

Figure 8:
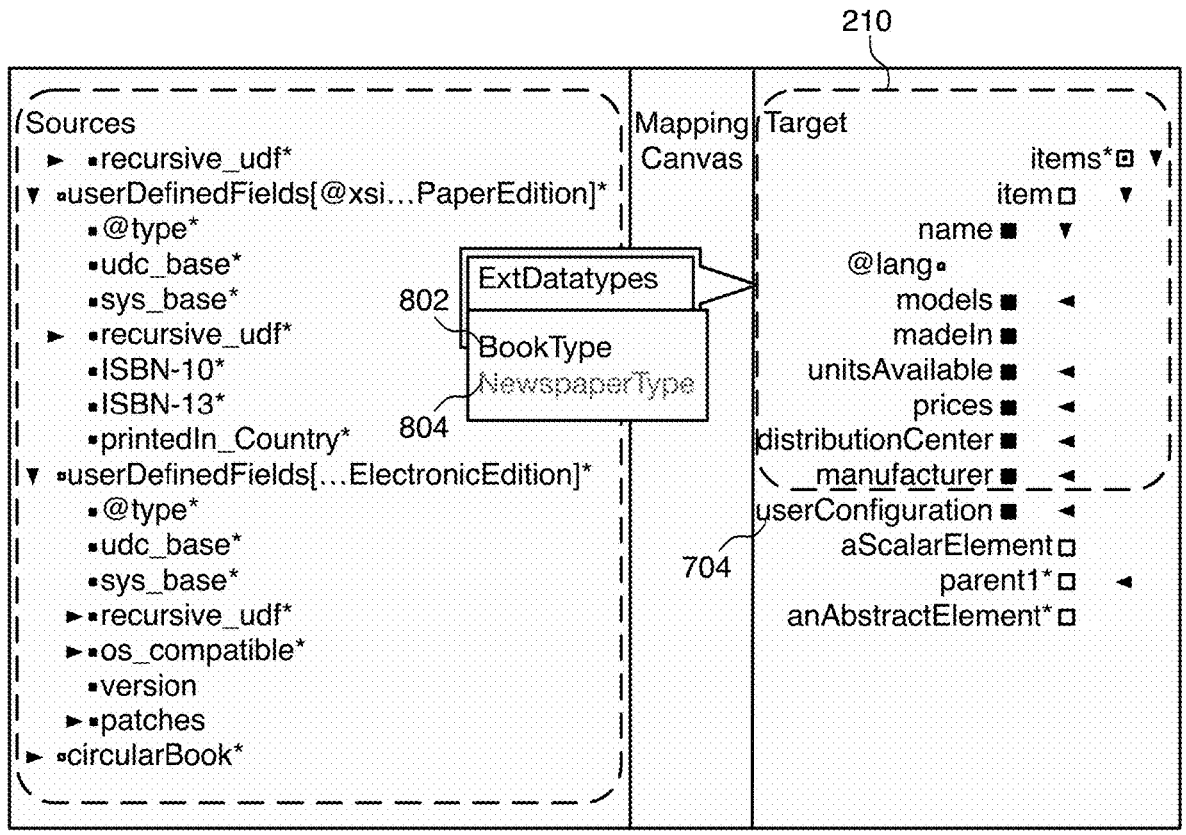
FIG. 8 illustrates an example UI showing XSD extension selections, according to some implementations.

FIG. 8 illustrates an example UI showing XSD extension selections 802 and 804 (labeled "BookType" and "NewspaperType," respectively), according to some implementations. As shown, XSD extension selections 802 and 804 are associated with element 704 (labeled "userConfiguration") of target XSD schema 210.

Figure 9:
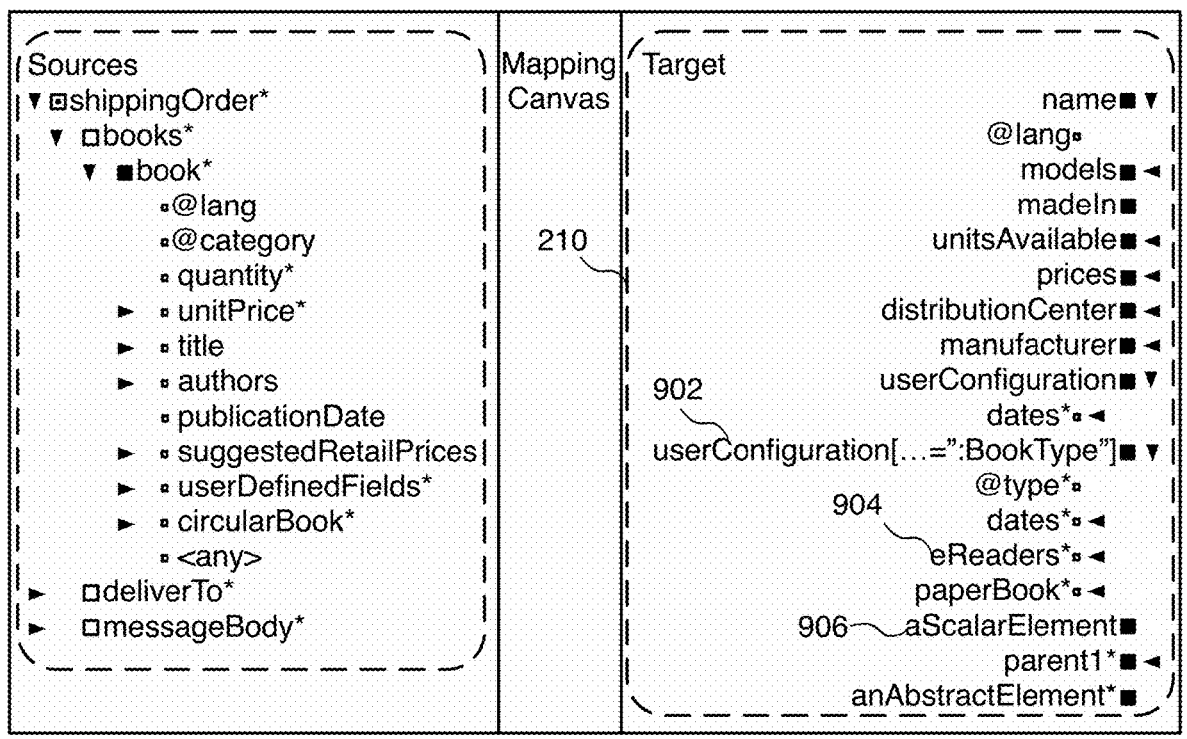
FIG. 9 illustrates an example UI showing an example XSD extension element, according to some implementations.

FIG. 9 illustrates an example UI showing an example XSD extension element 902 (labeled "userConfiguration . . . BookType"), according to some implementations. In this particular example scenario, XSD extension selection 802 ("BookType") (shown in FIG. 8) has been selected. As a result, XSD extension element 902 is displayed. As shown, XSD extension element 902 is associated with elements 904 (labeled "eReaders") and 906 (labeled "paperBook"), which are displayed.

In some implementations, the system detects existing mappings in the XSLT for XSD extension elements, then automatically loads those XSD extensions in the corresponding tree.

Figure 10:
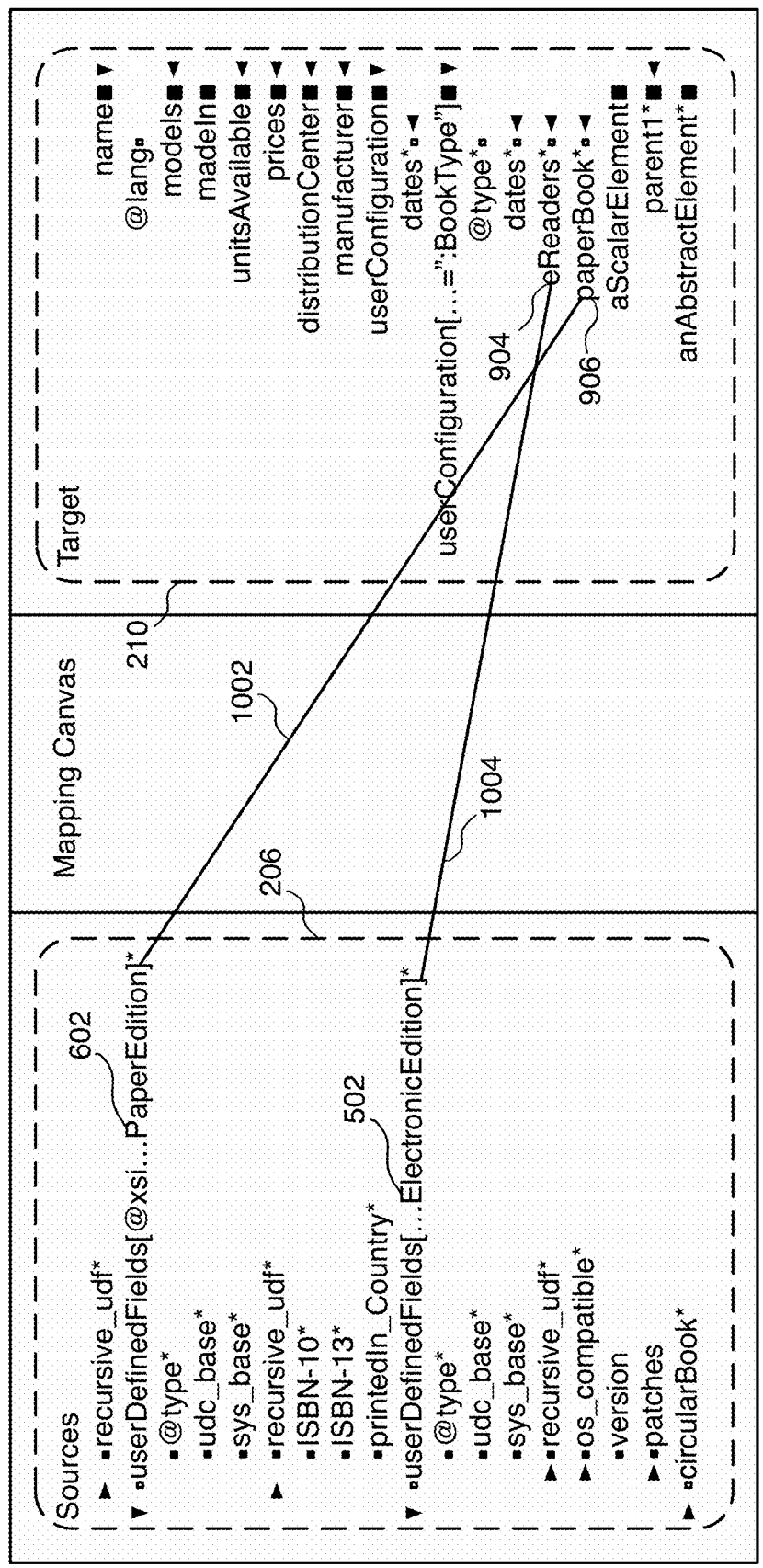
FIG. 10 illustrates an example UI showing mappings between XSD elements of the source XSD schema and corresponding XSD elements of the target XSD schema, according to some implementations.

FIG. 10 illustrates an example UI showing mappings between XSD elements 502 and 602 of the source XSD schema 206 and corresponding XSD elements 904 and 906 of the target XSD schema 210, respectively, according to some implementations. The user creating/editing XLST (also referred to as mappings) has all the information needed in place for creating mappings or XPath expressions for these polymorphic elements.

In some implementations, the system accurately creates an extensible markup language path language (XML path language or XPath) expression or the target tag for a specific extending data type in response to the user dragging and dropping onto an XSD extension element (of an extending data type). For a user, typing the accurate XPath and/or creating the target tag may be an involved task. Implementations automatically create such an XPath or target tag, thereby eliminating the need for the user to create such an XPath or target tag.

In various implementations, the system creates an extensible markup language path language (XML path language or XPath) expression for referencing at least one XSD extension element (extending or extended data type). In some implementations, the XPath expression references a concrete element of the XSD extension element. The system will append a predicate to the XPath expression, where the predicate selects the XSD extension element (concrete polymorphic element). ☐ The predicate consists of matching a runtime value of xsi:type attribute of the element against the qualified name of the extending data type.

In some implementations, the system determines a namespace at design time and creates the predicate, where the namespace is used for selection of the XSD extension element. The namespace will be the same at design time and runtime, and is used to select the XSD extension element. This predicate eliminates the need for a developer to know a prefix that will be used at runtime to represent the namespace.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations enable a user to easily view XSD extension elements in a user interface, as well as to map XSD elements between a source XSD schema and a target XSD schema.

Figure 11:
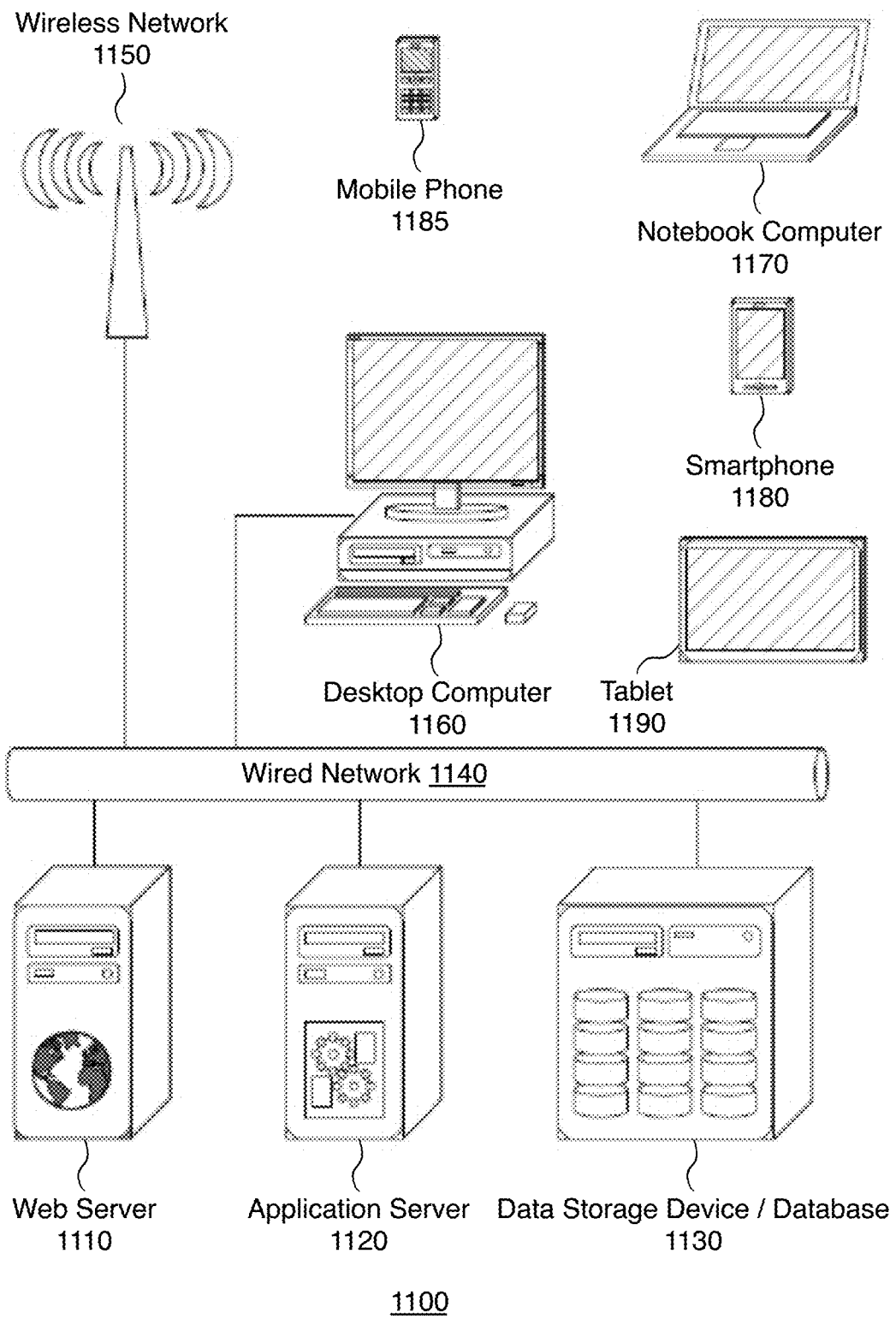
FIG. 11 illustrates a block diagram of an example system, which may be used for implementations described herein.

FIG. 11 illustrates a block diagram of an example system 1100, which may be used for implementations described herein. Example system 1100 is capable of supporting or running various hardware and/or software modules and associated implementations described herein. Note that certain implementations may be implemented using one or more standalone applications (for example, residing in a user device) and/or one or more web-based applications implemented using a combination of client-side and server-side code. While system 1100 performs implementations described herein, in other implementations, any suitable component or combination of components associated with system 1100 or any suitable processor or processors associated with system 1100 may facilitate performing the implementations described herein. In various implementations, system 1100 may not have all of the components shown and/or may have other elements including other types of components instead of, or in addition to, those shown herein.

General system 1100 includes user devices 1160-1190, including one or more desktop computers 1160, one or more notebook computers 1170, one or more smart-phones 1180, one or more mobile phones 1185, and one or more tablets 1190. General system 1100 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although system 1100 is shown with five user devices, any number of user devices can be supported.

A web server 1110 is used to process requests from web browsers and standalone applications for web pages, electronic documents, enterprise data or other content, and other data from the user computers. Web server 1110 may also provide push data or syndicated content, such as RSS feeds, of data related to enterprise operations.

An application server 1120 operates one or more applications. The applications can be implemented as one or more scripts or programs written in any programming language, such as Java, C, C++, C#, or any scripting language, such as JavaScript or European computer manufacturers association script (ECMAScript), Perl, hypertext preprocessor (PHP), Python, Ruby, or tool command language (TCL). Applications can be built using libraries or application frameworks, such as Rails, Enterprise JavaBeans, or .NET. Web content may be created using hypertext markup language (HTML), cascading style sheets (CSS), and other web technology, including templating languages and parsers.

The data applications running on application server 1120 are adapted to process input data and user computer requests and can store or retrieve data from data storage device or database 1130. Database 1130 stores data created and used by the data applications. In some implementations, database 1130 includes a relational database that is adapted to store, update, and retrieve data in response to SQL format commands or other database query languages. Other implementations may use unstructured data storage architectures and Not Only SQL (NoSQL) databases.

In some implementations, application server 1120 includes one or more general-purpose computers capable of executing programs or scripts. In some implementations, web server 1110 is implemented as an application running on the one or more general-purpose computers. Web server 1110 and application server 1120 may be combined and executed on the same computers.

An electronic communication network 1140-1150 enables communication between user computers 1160-1190, web server 1110, application server 1120, and database 1130. In some implementations, networks 1140-1150 may further include any form of electrical or optical communication devices, including wired network 1140 and wireless network 1150. Networks 1140-1150 may also incorporate one or more local-area networks, such as an Ethernet network, wide-area networks, such as the Internet; cellular carrier data networks; and virtual networks, such as a virtual private network.

System 1100 is one example for executing applications according to some implementations. In some implementations, application server 1110, web server 1120, and optionally database 1130 can be combined into a single server computer application and system. In further implementations, virtualization and virtual machine applications may be used to implement one or more of application server 1110, web server 1120, and database 1130.

In still further implementations, all or a portion of the web and application serving functions may be integrated into an application running on each of the user computers. For example, a JavaScript application on the user computer may be used to retrieve or analyze data and display portions of the applications.

In various implementations, system 1100 may not have all of the components shown and/or may have other elements including other types of components instead of, or in addition to, those shown herein.

Figure 12:
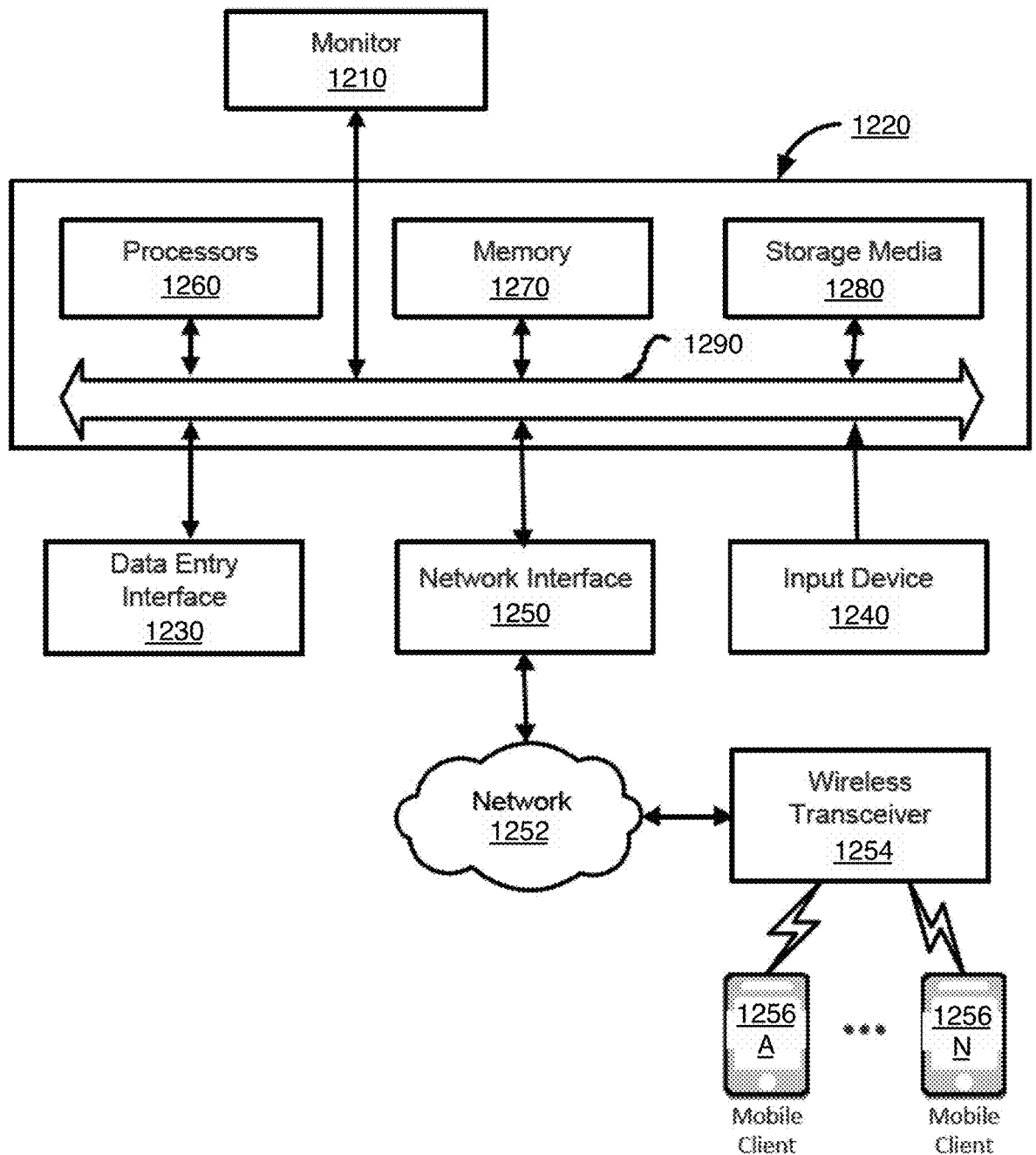
FIG. 12 illustrates a block diagram of an example network environment, which may be used for implementations described herein.

FIG. 12 illustrates a block diagram of an example network environment 1200, which may be used for implementations described herein. Network environment 1200 is merely illustrative and not intended to limit the scope of the claims. One of ordinary skill in the art would recognize other variations, modifications, and alternatives. For example, network environment 1200 may be implemented in a distributed client-server configuration having one or more client devices in communication with one or more server systems.

In one exemplary implementation, network environment 1200 includes a display device such as a monitor 1210, a computer 1220, a data entry interface 1230 such as a keyboard, touch device, and the like, an input device 1240, a network interface 1250, and the like. Input device 1240 is typically implemented as a computer mouse, a trackball, a track pad, wireless remote, tablet, touch screen, and the like. Moreover, input device 1240 typically allows a user to select and operate objects, icons, text, characters, and the like that appear, for example, on the monitor 1210.

Network interface 1250 may include an Ethernet card, a modem (telephone, satellite, cable, integrated services digital network (ISDN), etc.), an asynchronous digital subscriber line (DSL) unit, and the like. Furthermore, network interface 1250 may be physically integrated on the motherboard of computer 1220, may be a software program, such as soft DSL, or the like.

Network environment 1200 may also include software that enables communications over communication network 1252 such as the hypertext transfer protocol (HTTP), transmission control protocol/Internet protocol (TCP/IP), real-time transport protocol/real-time streaming protocol (RTP/RTSP), protocols, wireless application protocol (WAP), Institute of Electrical and Electronics Engineers (IEEE) 802.11 protocols, and the like. In addition to and/or alternatively, other communications software and transfer protocols may also be used, for example Internetwork packet exchange (IPX), user datagram protocol (UDP) or the like.

Communication network 1252 may include a local area network, a wide area network, a wireless network, an Intranet, the Internet, a private network, a public network, a switched network, or any other suitable communication network, such as for example cloud networks. Communication network 1252 may include many interconnected computer systems and any suitable communication links such as hardwire links, optical links, satellite or other wireless communications links such as Bluetooth, WIFI, wave propagation links, or any other suitable mechanisms for communication of information. For example, communication network 1252 may communicate to one or more mobile wireless devices 1256A-N, such as mobile phones, tablets, and the like, via a base station such as wireless transceiver 1254.

Computer 1220 may include familiar computer components such as one or more processors 1260, and memory storage devices, such as a memory 1270, e.g., random access memory (RAM), storage media 1280, and system bus 1290 interconnecting the above components. In one embodiment, computer 1220 is a PC compatible computer having multiple microprocessors, graphics processing units (GPU), and the like. While a computer is shown, it will be readily apparent to one of ordinary skill in the art that many other hardware and software configurations are suitable for use with implementations described herein. While computer 1220 performs implementations described herein, in other implementations, any suitable component or combination of components associated with computer 1220 or any suitable processor or processors associated with computer 1220 may facilitate performing the implementations described herein. In various implementations, computer 1220 may not have all of the components shown and/or may have other elements including other types of components instead of, or in addition to, those shown herein.

Memory 1270 and Storage media 1280 are examples of non-transitory tangible media for storage of data, audio/video files, computer programs or program instructions, and the like. Other types of tangible media include disk drives, solid-state drives, floppy disks, optical storage media such as compact disc-read only memory (CD-ROMS) and bar codes, semiconductor memories such as flash drives, flash memories, read-only-memories (ROMS), battery-backed volatile memories, networked storage devices, cloud storage, and the like.

Although the description has been described with respect to particular embodiments thereof, these particular embodiments are merely illustrative, and not restrictive. For example, while various implementations discussed herein address development, deployment, and use of dynamic business planning models used to implement cloud-based enterprise software applications and associated services, implementations are not limited thereto.

Various implementations need not be deployed via an Internet cloud, but instead may be hosted on an internal enterprise server on a local network. Furthermore various implementations may be implemented as desktop software, such that the incremental updating happens on the end-user computer on which the software leveraging the dynamic planning model runs. In addition, implementations are not limited to use in conventional business applications and computing environments, and may be used, for example, by governments, universities, and other organizations to facilitate various types of planning activities. In addition, implementations need not be limited to planning software, but may be used to dynamically update different types of software that may benefit by the ability to dynamically adapt to specific needs and/or changing needs of an organization and/or associated computing environment.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable storage medium carrying program instructions thereon, the instructions when executed by one or more processors cause the one or more processors to perform operations comprising:
   displaying a first extensible markup language schema definition (XSD) schema, wherein the first XSD schema includes a plurality of XSD elements arranged in a tree structure;
   receiving a selection of at least one XSD element of the plurality of XSD elements;
   accessing a map that associates XSD elements with XSD extensions;
   determining XSD extensions that correspond with the selected at least one XSD element based on the map;
   displaying the determined XSD extensions associated with the at least one XSD element;
   receiving at least one XSD extension selection that is selected from the determined XSD extensions; and
   loading the at least one XSD extension selection into the tree structure by appending in the tree structure at least one XSD extension element based on the at least one XSD extension selection.

2. The computer-readable storage medium of claim 1, wherein at least some of the XSD elements have extended data types.

3. The computer-readable storage medium of claim 1, wherein the instructions when executed are further operable to perform operations comprising displaying one or more extendable indications, and wherein each extendable indication indicates that a corresponding XSD element is extendable.

4. The computer-readable storage medium of claim 1, wherein the instructions when executed are further operable to perform operations comprising displaying one or more predetermined symbols, and wherein each of the one or more predetermined symbols indicates that a corresponding XSD element is extendable.

5. The computer-readable storage medium of claim 1, wherein the instructions when executed are further operable to perform operations comprising displaying a context menu, and wherein the context menu enables a user to select one or more extending data types to load in the tree structure.

6. The computer-readable storage medium of claim 1, wherein the instructions when executed are further operable to perform operations comprising:

creating an extensible markup language path language (XPath) expression for referencing at least one XSD extension element; and appending a predicate to the XPath expression, where the predicate selects the at least one XSD extension element.

7. The computer-readable storage medium of claim 1, wherein the instructions when executed are further operable to perform operations comprising determining a namespace, and wherein the namespace is used for selection of the at least one XSD extension element.

8. A method for managing extended schemas, the method comprising:

displaying a first extensible markup language schema definition (XSD) schema, wherein the first XSD schema includes a plurality of XSD elements arranged in a tree structure;

receiving a selection of at least one XSD element of the plurality of XSD elements;

accessing a map that associates XSD elements with XSD extensions;

determining XSD extensions that correspond with the selected at least one XSD element based on the map;

displaying the determined XSD extensions associated with the at least one XSD element;

receiving at least one XSD extension selection that is selected from the determined XSD extensions; and loading the at least one XSD extension selection into the tree structure by appending in the tree structure at least one XSD extension element based on the at least one XSD extension selection.

9. The method of claim 8, wherein at least some of the XSD elements have extended data types.

10. The method of claim 8, further comprising displaying one or more extendable indications, and wherein each extendable indication indicates that a corresponding XSD element is extendable.

11. The method of claim 8, further comprising displaying one or more predetermined symbols, and wherein each of the one or more predetermined symbols indicates that a corresponding XSD element is extendable.

12. The method of claim 8, further comprising displaying a context menu, and wherein the context menu enables a user to select one or more extending data types to load in the tree structure.

13. The method of claim 8, further comprising:

creating an extensible markup language path language (XPath) expression for referencing at least one XSD extension element; and appending a predicate to the XPath expression, where the predicate selects the at least one XSD extension element.

14. The method of claim 8, further comprising determining a namespace, wherein the namespace is used for selection of the at least one XSD extension element.

15. An apparatus comprising:

one or more processors; and logic encoded in one or more non-transitory computer-readable storage media for execution by the one or more processors and when executed operable to perform operations comprising:

displaying a first extensible markup language schema definition (XSD) schema, wherein the first XSD schema includes a plurality of XSD elements arranged in a tree structure;

receiving a selection of at least one XSD element of the plurality of XSD elements;

accessing a map that associates XSD elements with XSD extensions;

determining XSD extensions that correspond with the selected at least one XSD element based on the map;

displaying the determined XSD extensions associated with the at least one XSD element;

receiving at least one XSD extension selection that is selected from the determined XSD extensions; and loading the at least one XSD extension selection into the tree structure by appending in the tree structure at least one XSD extension element based on the at least one XSD extension selection.

16. The apparatus of claim 15, wherein at least some of the XSD elements have extended data types.

17. The apparatus of claim 15, wherein the logic when executed are further operable to perform operations comprising displaying one or more extendable indications, and wherein each extendable indication indicates that a corresponding XSD element is extendable.

18. The apparatus of claim 15, wherein the logic when executed are further operable to perform operations comprising displaying one or more predetermined symbols, and wherein each of the one or more predetermined symbols indicates that a corresponding XSD element is extendable.

19. The apparatus of claim 15, wherein the logic when executed are further operable to perform operations comprising displaying a context menu, and wherein the context menu enables a user to select one or more extending data types to load in the tree structure.

20. The apparatus of claim 15, wherein the logic when executed are further operable to perform operations comprising:

creating an extensible markup language path language (XPath) expression for referencing at least one XSD extension element; and appending a predicate to the XPath expression, where the predicate selects the at least one XSD extension element.

* * * * *